INVENTOR.
John L. Slonneger,
BY
Attorney.

Feb. 15, 1966   J. L. SLONNEGER   3,234,805
SEQUENCE TIMER CONTROLS
Filed March 24, 1964   2 Sheets-Sheet 2

INVENTOR.
John L. Slonneger,
BY
Attorney.

United States Patent Office 3,234,805
Patented Feb. 15, 1966

3,234,805
SEQUENCE TIMER CONTROLS
John L. Slonneger, Morrison, Ill., assignor to General Electric Company, a corporation of New York
Filed Mar. 24, 1964, Ser. No. 354,375
9 Claims. (Cl. 74—157)

The present invention relates to sequence timer controls and more particularly to an improved sequence timer control for actuating a plurality of control devices in a preselected sequence.

The timer control of the present invention is particularly adapted for use with domestic appliances of various kinds such as dryers, washing machines, dishwashers and the like, where control devices, such as switching contacts and the like, must be actuated in preselected sequence to effect the various cycles of operation of the appliance. To initiate the operation of the appliance the operator needs only to manually turn a control knob from an "off" position to a selected position. The angular rotation of the control knob from the "off" position results in an angular displacement of a cam assembly. The cam assembly with its associated cam followers actuates one or more switches in the electrical circuits of the appliance to cause the system to be energized. The control includes a timer motor that drives the cam assembly in a timed step-by-step movement to effect a set or sequence of control operations. Thus, with a single setting of the control knob, the operation of the appliance is initiated, the control functions are carried out, and the appliance is turned off with the control knob restored to its initial or "off" position. If desired, means may be provided to return the cam assembly at different rates of speeds to provide different timed sequences of operation.

In some applications of sequence timer controls to clothes dryers, it is particularly desirable to have a control knob settable selectively to effect two distinct sets or programs of operations. For example, in a clothes dryer it is desirable to provide a straight timed dry operation during which the clothes are tumbled and dried for a considerably long interval after which a cooldown period is provided. Also, the sequence timer control should be settable to a selected position on an expanded scale on a dial in which a second or an automatic dry set of operations will be effected. When the operator turns the control knob to a selected automatic dry position, the clothes are tumbled and dried until they reach a predetermined condition of dryness at which time the control initiates a timed sequence of operations, which may include a runout period and a cooldown period. Also, after the control knob is rotated to a preselected position, preferably, it should be possible to modify the duration or sequence of operations in accordance with the desires of the operator. For example, it may be desirable to shorten the interval of certain operations or to bypass them entirely. In each of the two sets of control operations, it is desirable, that the cam assembly always be returned to its initial or "off" position.

It is a general object of my invention to provide an improved sequence timer control for operating a plurality of switches or other control devices in a selectively variable predetermined sequence.

It is a principal object of my invention to provide an improved sequence timer control in which two sets of control operations are provided by selectively rotating a single control knob.

Another object of this invention is to provide an improved sequence timer control having a cam assembly for effecting two distinct sets of control operations wherein the cam assembly is driven to a single "off" position after performing either set of control operations and is capable of being driven at different rates of speed if desired.

In accordance with one form of my invention, I have provided an improved sequence timer control comprised of a cam assembly that is manually rotatable to one or more positions in a first angular direction to provide a first set or sequence of control operations and is manually rotatable to one or more positions in a second angular direction to provide a second set or sequence of control operations. Either or both of the sets of control operations may be initiated in response to a predetermined control condition. The cam assembly includes at least one switching cam member that engages a cam follower for actuating a plurality of control devices in a predetermined sequence. When set to a position in either angular direction, the cam assembly is returned to a single "off" position in which the control devices are deenergized.

To effectuate the first set of control operations, a first drive means driven by a timer motor is provided and is drivingly engageable with the cam assembly only when the cam assembly is manually set to a position in the first angular direction. When the cam assembly is engaged with the first drive means, it is driven through the first set of control operations and upon completion thereof it is returned to the "off" position. To carry out the second set of control operations, a second drive means driven by the timer motor is drivingly engageable with the cam assembly only when the cam assembly is set in a position in the second angular direction. In the illustrated exemplification of the invention the cam assembly effects the second set of control operations only after occurrence of a predetermined control condition.

In a more specific aspect of the invention, the cam assembly is provided with a cam shaft, a first and a second lift cam member and a ratchet wheel that is frictionally engaged on the cam shaft. A first pawl eccentrically driven by a timer motor is engageable with the ratchet wheel to effect a step-by-step movement of the ratchet wheel to drive the cam assembly through the first set of control operations when the first pawl is engaged with the ratchet wheel. Also, a second pawl eccentrically driven by the timer motor is engageable with the ratchet wheel to effect a step-by-step movement of the ratchet wheel when the second pawl is engaged with the ratchet wheel.

A first cam follower on the first pawl engages the first lift cam member. This engagement permits the first pawl to be engaged with the ratchet wheel when the cam assembly is manually set to a selected position in the first angular direction. However, it prevents the first pawl from being engaged with the ratchet wheel when the cam assembly is manually set to a selected position in the second angular direction.

A second cam follower is provided on the second pawl for engagement with the second lift cam member of the cam assembly. A latching relay prevents the second cam follower from engaging the other lift cam member until the relay is actuated in response to the predetermined control condition. When the cam assembly is set to a position in the second angular direction and the latching relay releases the second cam follower, the second pawl drivingly engages the ratchet wheel and effects a step-by-step movement of the ratchet wheel to carry out the second set of control operations. Upon completion of the control operation the cam assembly is returned to the "off" position.

An important avantage of the improved arrangement is that it is possible to provide a single rotatable cam assembly with a single "off" position and with two distinct programs of control operations by simply rotating the cam assembly in either of two angular directions to select the desired program of control.

The features of my invention which I believe to be novel are set forth with particularity in the appended claims. My invention, however, both as to organization and method of operation together with further objects and advantages thereof, may be best understood by reference to the following description taken in conjunction with the accompanying drawings in which:

Figure 1:
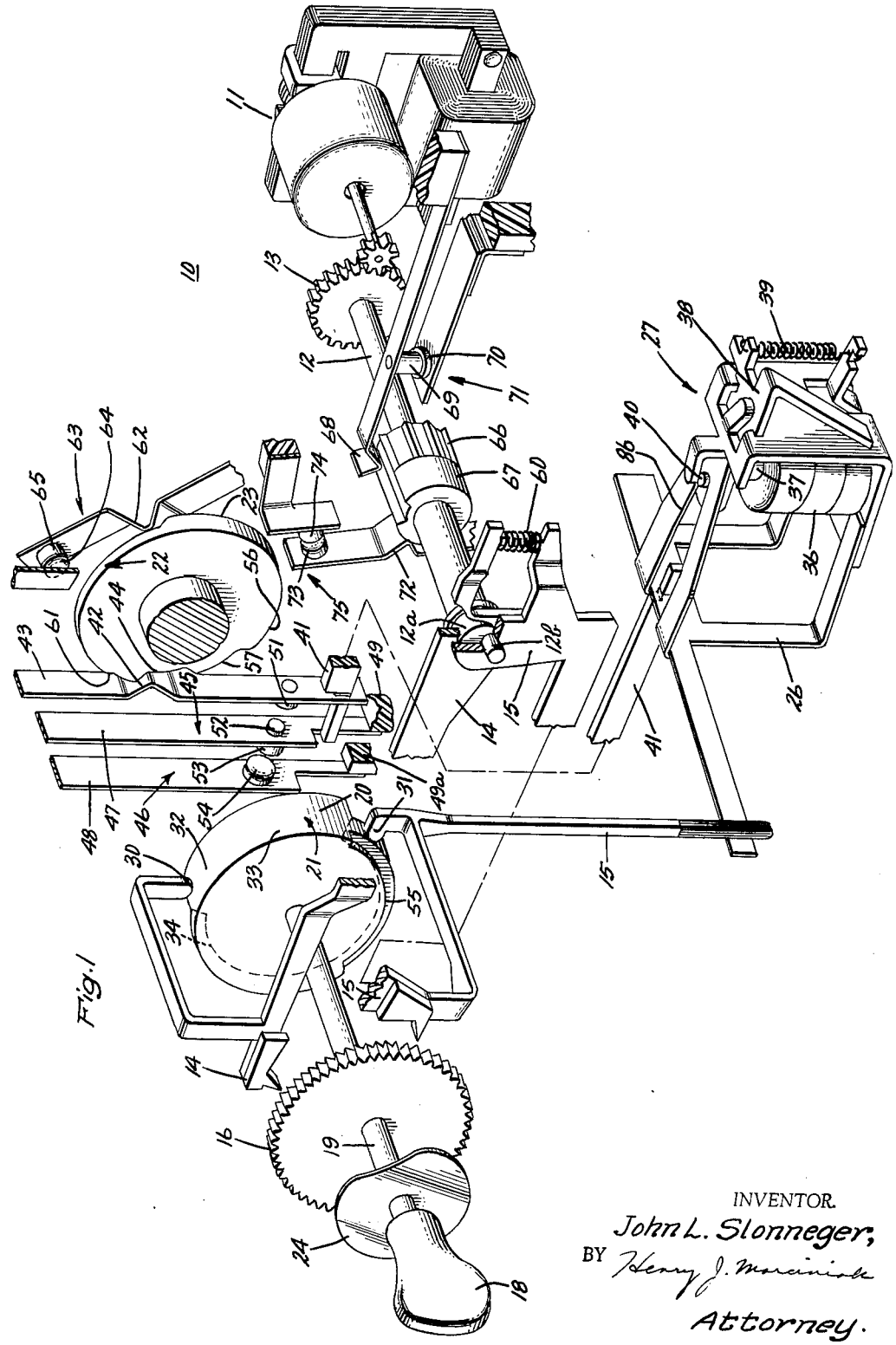
FIGURE 1 is a diagrammatic perspective view of the improved sequence timer control embodying one form of the invention, the parts thereof being partially broken apart to show the detailed structural arrangement of the various components of the control.

Referring now more specifically to the drawings, the sequence timer control incorporating one form of the invention is identified generally by the reference numeral 10. The sequence timer control 10 includes an electrically energized motor 11 that drives a first cam shaft 12 through a speed reduction gear train 13. At the other end of the driving shaft 12 a pair of pawls 14 and 15 are eccentrically carried on the driving shaft 12 on bearings 12a and 12b, (see FIGURE 1) and the offset of bearing 12b is approximately twice that of bearing 12a. The pawls 14, 15 are selectively engageable with the ratchet wheel 16 to effect a step-by-step movement of the cam assembly 17 to the "off" position in a counterclockwise or a clockwise direction. Pawl 14 advances ratchet wheel 16 one tooth per revolution of drive shaft 12, and pawl 15 advances it two teeth per revolution.

As is best seen in FIGURE 1, the cam assembly 17 includes a control knob 18 attached to a shaft 19, the ratchet wheel 16, a pair of lift cam members 20, 21, a radial switch cam member 22, a face cam 23, and a torque spring 24. The ratchet wheel 16 is frictionally engaged with the shaft 19. When the control knob 18 is turned in a clockwise direction to set the cam assembly 17 in a selected position for a first programmed set of operations, the pawl 14 drops into engagement with ratchet wheel 16. Thus, the ratchet wheel 16 is held by the pawl 14 as the control knob 18 is manually rotated, and slippage occurs between the shaft 19 and the ratchet wheel 16. It will be noted, however, that when the control knob 18 is turned in a counterclockwise direction, the cam assembly 17 is not restrained by the pawls 14, 15. Pawl 14 is held out of engagement with the ratchet wheel 16 by the lift cam member 20, and the other pawl 15 is held out of engagement by a latch spring 26 of a latching relay 27. The ratchet wheel 16 will therefore rotate with the shaft 19 as the control knob 18 is manually set to a selected position in a counterclockwise direction.

In accordance with the invention when the control knob 18 is rotated in a clockwise direction to a selected angular position, a first set or sequence of programmed switching operations is initiated. It will be noted that for a selected position in a clockwise direction, pawl 14 is immediately engaged with the ratchet wheel 16, and the pawl drives the cam assembly 17 step-by-step to effect a desired sequence of switching operations and to return the control member to the "off" position. Although in the illustrative embodiment of the invention, one switch cam member 22 and face cam 23 were utilized, it will be appreciated that additional cams may be used to perform other desired switching or control operations in a predetermined sequence.

When the operator turns the control knob 18 in a counterclockwise direction to a selected position, even though the lift cam member 21 will allow the pawl 15 to engage the ratchet wheel 16, the cam assembly 17 is not immediately coupled with the driving shaft 12 since the latching relay 27 holds the pawl 15 out of engagement with the ratchet wheel 16. With the cam assembly 17 in a selected position in the counterclockwise direction, a second set of programmed switching operations may be provided in response to the occurrence of a predetermined control condition of the appliance. Upon occurrence of the control condition, pawl 15 is released by the latching relay for engagement with the ratchet wheel 16 to start the second set of control operations. In the control of the illustrated embodiment of the invention, the relay 27 was operated by a resistance sensing circuit of a fabric dryer and actuated when the resistance of the clothes reached a predetermined magnitude.

An important advantage of the double pawl and ratchet wheel arrangement is that the cam assembly can be driven to a single "off" position and is capable of providing two distinct programmed switching control operations, one or both of which may be condition responsive. Pawl 14 drives the ratchet wheel 16 step-by-step in a counterclockwise position at a rate of speed to effect the first set of control operations and finally return the cam assembly to the "off" position shown in FIGURE 1. When released by the latching relay 27, pawl 15 drives the ratchet wheel step-by-step in a clockwise direction at a second rate of speed to effect a second set of control operations and finally to return the cam assembly 17 to the "off" position. Although in the illustrated embodiment only one of the sets of operations was initiated in response to a control condition, it will be apparent that both sets of operations may be initiated in response to a predetermined condition by the provision of a second latching relay for the pawl 14.

Continuing further with the description of the mechanical features of the improved timer control 10, I will now more fully describe the cam arrangement employed in the illustrative embodiment of my invention. It will be seen that pawls 14 and 15 have cam followers 30 and 31 which are associated with the lift cam members 20 and 21 respectively. When the control knob 18 is set to the "off" position, as shown in FIGURE 1, both pawls 14 and 15 are lifted out of engagement with the ratchet wheel 16. The cam follower 30 of pawl 14 is resting on the raised section 32 of the cam member 20. The other cam follower is also in position over a raised section 33 of cam member 21, and is held out of engagement with cam member 21 by the latching relay 27.

When the control knob 18 is turned in a clockwise direction to a selected position, the cam follower 30 drops into recessed section 34 (dotted line in FIGURE 1) of the lift cam member 20. The cam follower 31 of pawl 15 is prevented from engaging the ratchet wheel 16 by the raised portion 33 of cam member 21. Thus, it will be appreciated that only one of the pawls 14 or 15 is engageable with the ratchet wheel 16 for either of the sets of programmed control operations.

Figure 2:
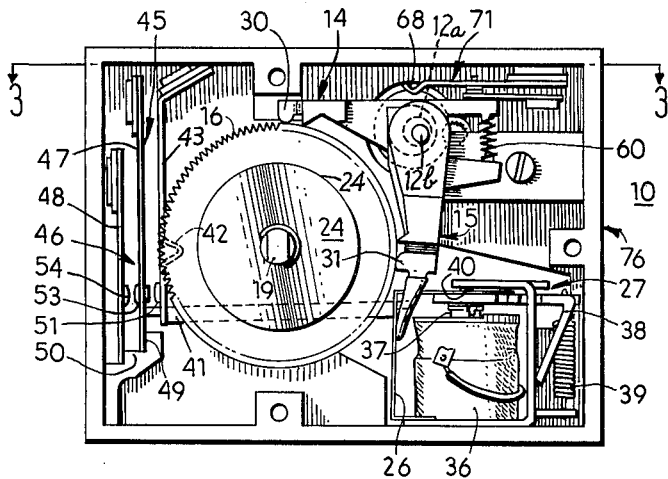
FIGURE 2 is a front elevational view of a sequence timer control shown diagrammatically in FIGURE 1, the front coverplate being removed in order to better illustrate the details of the control.

As is best seen in FIGURES 1 and 2, the latching relay 27 includes the latch spring 26, a coil or winding 36, a core 37, an armature 38, an armature spring 39 and a latching element 40. When electrical energy supplied to the relay coil 36 is sufficient to actuate the coil 36, the armature 38 is pulled down toward the core 37 to release the latching element 40 from its engagement in the slot 86 of the latch spring 26. The element 40 is relatched by the push rod 41 whenever the cam assembly 17 is returned to the "off" position. In the "off" position the cam follower 42 of the switch arm 43 falls into a recess 44 of the switch cam 22 and imparts a lateral movement to the push rod 41. This lateral movement causes the latch spring 26 to bend thereby moving the slot 86 over the latching element 40 to effect a relatching of the relay 27.

Figure 4:
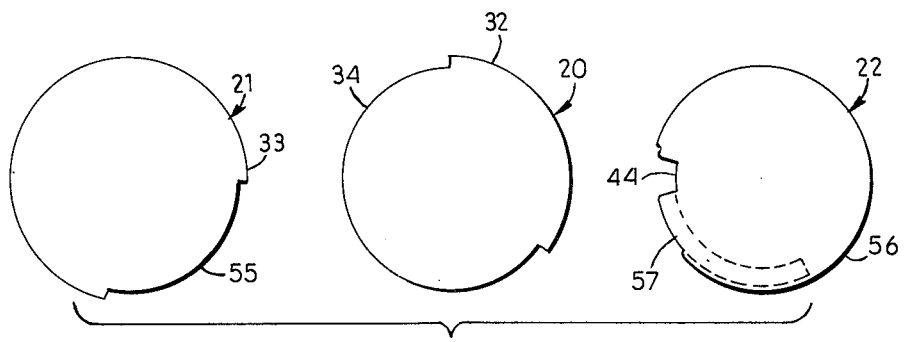
FIGURE 4 is an outline drawing of the cam members.

Having more specific reference now to the switch cam 22, as shown in FIGURES 1 and 4, I will now more fully describe how the pair of switches 45 and 46 were actuated. In the "off" position of the cam assembly 17 as shown in FIGURE 1, the cam follower 42 is engaged in the recess 44, and the switch arms 47, 48 abut the stops 49, 49a so that the contacts 51, 52 of switch 45 and the contacts 53, 54 of switch 46 are open. Also, when the control knob 18 is rotated in a clockwise direction so that the cam follower 42 is engaged on surface 56 of cam member 22, the switch arm 43 is displaced to close both switches 45 and 46. For example, in a dryer application, the closure of these switches would result in the energization of the drive motor, the heating elements, and the timer motor.

So long as the cam follower 42 engages surface 56 while the cam assembly 17 is driven step-by-step in a counterclockwise direction by pawl 14, the switches 45, 46 remain closed. When the cam follower 42 drops into engagement with the recessed surface 57, switch 46 is now opened. In a dryer where switch 46 was used to energize the heating elements, the control 10 would now effect a predetermined cooldown period. During the cooldown period unheated air will circulate through the fabrics tumbling in the dryer. At the end of this period the cam follower 42 is biased by spring blade 43 into recess 44 to open switch 45 and completely turn off the appliance. It will be appreciated, of course, that during the timed control operations the condition responsive relay 27 is ineffective because the cam follower 31 of pawl 15 rides on the raised section 33 of the lift cam member 21. It is only when the cam assembly 17 is rotated in a counterclockwise direction to a selected position where the recessed section 55 of cam member 21 is adjaecnt to the cam follower 31 that the condition responsive relay 27 comes into play.

Let us assume now that it is desired to operate the control 10 to effect a condition responsive set of operations. The operator turns the control knob 18 in a counterclockwise direction. During the rotation in the counterclockwise direction the ratchet wheel 16 rotates with the shaft 19 since cam follower 30 rides on the raised section 32 of lift cam member 20 and keeps pawl 14 out of engagement with the ratchet wheel 16. Also, pawl 15 is latched out of engagement with the recessed section 55 of cam member 21 by the latch spring 26. It will be noted that the pawl 15 is not prevented by the lift cam member 21 from engaging the ratchet wheel 16 but will lock in with the ratchet wheel 16 when released by the relay 27.

When pawl 15 locked in with the ratchet wheel 16 the switch cam member 22 is driven step-by-step in a clockwise direction. During the period in which the cam assembly 17 is being returned to the "off" position, a desired number of switching operations may be performed. Near the end of the runout, an interval of control is provided during which switch 45 is closed and switch 46 is open. Also, it will be seen that the cam follower 62 engages the face cam 23 for actuating a switch 63 having a pair of switching contacts 64 and 65. Although in the illustrative embodiment of my invention I have only shown the single switch cam member 22 with face cam 23, it will be appreciated that a stack of switch cams may be used to perform other sequences of switching operations as may be desired.

In applications where it is desired to actuate a control device while either of the two sets of control operations are being carried out, suitable cams 66, 67 may be provided in the driving shaft 12. The cam 66 engages a cam follower 68 to intermittently open and close the switch contacts 69, 70 of switch 71. Similarly, cam 67 engages a cam follower 72 to cyclically open switch contacts 73, 74 of switch 75 for a fixed interval and to close the contacts 73, 74 for a relatively shorter interval.

Figure 3:
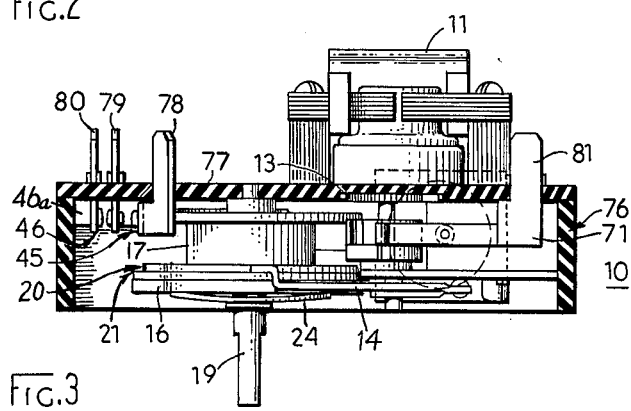
FIGURE 3 is a sectional view taken generally along lines 3—3 of the control shown in FIGURE 2.

Having more specific reference now to FIGURES 2 and 3, I have shown therein the control 10 housed in a case 76, with the coverplate and control knob removed. The timer motor 11 is mounted on the back wall 77. The cam assembly 17 is rotatably supported by the back wall 77 and coverplate (not shown). The terminals 78, 79 and 80 are provided for connecting the switches 45 and 46 in the external circuit. A terminal 81 is also brought out at the back wall 77 to provide a connection for a circuit lead or leads. It will be seen in FIGURES 2 and 3 that control 10 can be made into a relatively small and compact unit.

From the foregoing description of the improved timer control arrangement, it will be apparent that two programmed switching control operations can be provided by manually setting a cam assembly that is automatically returned to a single "off" position upon completion of a selected set of control operations. Either one or both of the programmed switching operations can be initiated in response to a predetermined control condition appliance. While the present invention has been described in connection with a detailed illustrative embodiment thereof, it should be understood that the details are not intended to be limitative of the invention. Further, it will be apparent to those skilled in the art that many changes and modifications may be made without departing from the invention. It is therefore intended in the appended claims to cover all such equivalent variations that fall within the true spirit and scope of my invention.

What I claim as new and desire to secure by Letters Patent of the United States is:

1. A sequence timer control comprising: a rotatable cam assembly, said cam assembly including cam members for sequentially actuating control devices, said cam assembly having a single "off" position, said cam assembly being rotatable in a first angular direction from said "off" position for effecting a timed cycle of operation and also rotatable in a second angular direction from said "off" position to provide a condition responsive cycle of operation, a timer motor, a driving shaft, gear means connecting said motor with said driving shaft, a first drive means coupled with said driving shaft for driving said cam assembly through the timed cycle of operation and finally to the "off" position, a second drive means coupled with said driving shaft for driving said cam assembly through the condition responsive cycle of operation, one of said cam members of the cam assembly having means for effecting driving engagement of said first drive means with said cam assembly when said cam assembly is manually rotated in said first angular direction to a selected position another one of said cam members having means for effecting driving engagement of said second drive means with said cam assembly when the cam assembly is manually rotated in said second angular direction to a selected position, and a condition responsive means for holding said second drive means out of engagement with said cam assembly and for releasing said second drive means into driving engagement with the cam assembly in response to a predetermined control condition to thereby drive the cam assembly through the condition responsive cycle of operation and finally to said "off" position.

2. A sequence timer control comprising: a main cam assembly supported for rotation, said cam assembly including a pair of lift cam members and at least one switching cam member, a cam follower engaging said switching cam member for actuating switching contacts in a predetermined sequence, said cam assembly having an "off" position when said switching contacts are open to cause the devices controlled by the timer control to be deenergized, said cam assembly being manually settable in a first angular direction from said "off" position to a selected position for providing a first sequence of control operations, said cam assembly also being manualy settable in a second angular direction from said "off" position to a selected position for providing a second sequence of control operations in response to a predetermined control condition, a timer motor, a first mechanical stepping means driven by said timer motor for stepping said cam assembly from the selected position in said first angular direction thereby to carry out said first sequence of control operations and return the cam to said "off" position, and a second mechanical stepping means driven by said timer motor and engageable with said cam assembly only in response to the predetermined control condition for stepping said cam assembly from the selected position in said second angular direction to carry out said second sequence of control operations in response to said predetermined control condition and return said cam assembly to said single "off" position.

3. A sequence timer control comprising: a cam assembly rotatable in a first angular direction to a selected position for providing a first set of control operations and rotatable in a second direction to a selected position for providing a second set of control operations in response to a predetermined control condition, said cam assembly including a cam shaft, a first and second lift cam member, a switching cam member, and a ratchet wheel frictionally engaged with said cam shaft, a timer motor, a first pawl eccentrically driven by said timer motor and having cam follower means engaged with said first lift cam member for effecting engagement of said first pawl with said ratchet wheel when said cam assembly is manually set to the selected position in said first angular direction, said first pawl restraining movement of said ratchet wheel relative to said cam shaft as said cam assembly is manually set to a position in said first angular direction, a second pawl eccentrically driven by said timer motor and having a cam follower means for engagement with said second lift cam member, and a condition responsive latching relay for releasing said cam follower means of said second pawl for engagement with said second lift cam member in response to a predetermined control condition to cause said second pawl to drivingly engage said ratchet wheel, said first pawl when engaged with said ratchet wheel stepping said cam assembly from said selected position in the first angular direction to effect the first set of control operations and return the cam assembly to the "off" position, and said second pawl when engaged with said ratchet wheel stepping said cam assembly from said selected position in the second angular direction to effect a second set of control operations and return the cam assembly to said "off" position.

4. A sequence timer control comprising: a rotatable cam assembly, said cam assembly including a pair of lift cam members, a switching cam member, and a ratchet wheel frictionally engaged with said cam shaft, a cam follower engaged with said switching cam for actuating switching contacts for energizing and deenergizing devices controlled by the timer control, said cam assembly having an "off" position when the switching contacts are open, said cam assembly being rotatable to a selected position in a first angular direction from the "off" position for providing a first set of control operations and being rotatable to a selected position in a second angular direction from the "off" position for providing a second set of control operations in response to a predetermined control condition, a timer motor energized when said cam assembly is rotated in either angular direction from said "off" position, a reduction gear means, a driving shaft driven by said timer motor through said reduction gear means, a first pawl eccentrically driven by said driving shaft to effect a step-by-step movement of said ratchet wheel in said second angular direction when engaged therewith, a second pawl eccentrically driven by said driving shaft and engageable with said ratchet wheel to effect a step-by-step movement of said ratchet wheel in said first angular direction, first cam follower means on said first pawl engaging one of said lift cam members for effecting engagement of said first pawl with said ratchet wheel when said cam assembly is manually set to the selected position in said first angular direction and for preventing engagement therewith when said cam assembly is manually set to a selected position in the second angular direction, second cam follower means on said second pawl for engagement with the other of said lift cam members, a latching relay means preventing said second cam follower means from engaging said other of said lift cam members until said relay means is actuated in response to the predetermined control condition, and said second cam follower means when engaged with said other of said lift cam members causing said second pawl to drivingly engage said ratchet wheel when the cam assembly is in a selected position in said second angular direction and to prevent engagement with the ratchet wheel when the cam assembly is in a selected position in the first angular direction.

5. A sequence timer control for providing a first and a second set of switching operations, said sequence timer control comprising: a manually rotatable cam assembly including at least one switching cam member, a cam follower engaged with said switching cam member for sequentially actuating switching contacts, said cam assembly having a single "off" position when said switching contacts are deenergized, said cam assembly being rotatable to a position in a first angular direction to provide the first set of switching operations and being rotatable to a position in a second angular direction to provide the second set of switching operations in response to a predetermined control condition, a timer motor energized when said cam assembly is rotated from the "off" position, a speed reduction gear means, a driving shaft driven by said timer motor through said reduction gear means, a first mechanical stepping means driven by said driving shaft and drivingly coupled with said cam assembly only when said cam assembly is rotated to a position in said first angular direction thereby to drive said cam assembly through said first set of switching operations and return said cam assembly to the "off" position, and a second mechanical stepping means driven by said driving shaft and drivingly coupled with said cam assembly to carry out said second set of switching operations only when said cam assembly is rotated to a position in said second angular direction and after occurrence of said predetermined control condition.

6. A sequence timer control comprising: a cam assembly manually rotatable to a position in a first angular direction to provide a first sequence of control operations and manually rotatable to a position in a second angular direction to provide a second sequence of control operations in response to a predetermined control condition, said cam assembly including at least one switching cam member, a cam follower engaged with said switching cam member for actuating a plurality of switching contacts, said cam assembly having a single "off" position when said switching contacts are deenergized, a timer motor, a first mechanical stepping means driven by said timer motor and drivingly engageable with said cam assembly when said cam assembly is manually set to a position in said first angular direction to thereby drive said cam assembly through said first sequence of control operations and return said cam assembly to the "off" position, and a second mechanical stepping means driven by said timer motor and drivingly engageable with said cam assembly only when said cam assembly is rotated to a position in said second angular direction and after occurrence of said predetermined control condition.

7. A sequence timer control comprising: a cam assembly rotatable to a position in a first angular direction to provide a first set of control operations and rotatable to a position in a second angular direction to provide a second set of control operations in response to a predetermined control condition, a cam follower means engaged with said cam assembly for actuating at least one control device, said cam assembly having a single "off" position at which the control device is deenergized, a timer motor energized when said cam assembly is rotated in either angular direction from said "off" position, a first drive means driven by said timer motor and drivingly engageable with said cam assembly only when said cam assembly is set to a position in said first angular direction thereby to drive said cam assembly through said first set of control operations and finally to return said cam assembly to the "off" position, and a second drive means driven by said timer motor and drivingly engageable with said cam assembly when said cam assembly is set in a position in said second angular direction and after occurrence of said predetermined control condition.

8. A sequence timer control for providing a first and a second set of control operations, said sequence timer control comprising: a rotatable cam assembly including at least one control cam member for actuating a plurality of control devices, cam follower means engaged with said control cam member, said cam assembly having a single "off" position when said control devices are deenergized, said cam assembly being rotatable to a position in a first angular direction to provide the first set of control operations and being rotatable to a position in a second angular direction to provide the second set of control operations in response to a predetermined control condition, a timer motor energized when said cam assembly is rotated from the "off" position in either direction, a first drive means driven by said timer motor and drivingly engageable with said cam assembly only when said cam assembly is set to a position in said first angular direction to thereby drive said cam assembly through the first set of control operations and upon completion thereof to return said cam assembly to the "off" position, and a second drive means driven by said timer motor and drivingly engageable with said cam assembly only when said cam assembly is set to a position in said second angular direction and after occurrence of said predetermined control condition to thereby drive said cam assembly to effect the second set of control operations and return said cam assembly to the "off" position.

9. A sequence timer control comprising: a cam assembly rotatable to a position in a first angular direction to provide a first set of control operations and rotatable to a position in a second angular direction to provide a second set of control operations in response to a predetermined control condition, cam follower means engaged with said cam assembly for actuating at least one control device, said cam assembly having a single "off" position at which the control device is deenergized, a timer motor energized when said cam assembly is rotated in either angular direction from said "off" position, drive means driven by said timer motor for driving said cam assembly in opposite directions, and control means for engaging said drive means to drive said cam assembly in one direction when said cam assembly is set to a position in said first angular direction thereby to drive said cam assembly through said first set of control operations and return said cam assembly to the "off" position, and said control means also including means for engaging said drive means to drive said cam assembly in the opposite direction when said cam assembly is set in a position in said second angular direction and after occurrence of said predetermined control condition.

References Cited by the Examiner
UNITED STATES PATENTS

| | | | |
|---|---|---|---|
| 2,343,549 | 3/1944 | Groghan | 74—150 |
| 2,933,931 | 4/1960 | Lisinski | 74—149 |
| 3,194,903 | 7/1965 | Dronberger | 200—38 |

BROUGHTON G. DURHAM, *Primary Examiner.*

J. A. MARSHALL, *Assistant Examiner.*